(12) United States Patent
Brucker et al.

(10) Patent No.: US 10,068,093 B2
(45) Date of Patent: Sep. 4, 2018

(54) MACHINE-CHECKABLE CODE-ANNOTATIONS FOR STATIC APPLICATION SECURITY TESTING

(71) Applicant: SAP SE, Walldorf (DE)

(72) Inventors: Achim D. Brucker, Sheffield (GB); Michael Herzberg, Moeglingen (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 14/965,397

(22) Filed: Dec. 10, 2015

(65) Prior Publication Data
US 2017/0169228 A1 Jun. 15, 2017

(51) Int. Cl.
*G06F 21/57* (2013.01)
*G06F 21/56* (2013.01)
(Continued)

(52) U.S. Cl.
CPC ............. *G06F 21/577* (2013.01); *G06F 8/30* (2013.01); *G06F 8/43* (2013.01); *G06F 8/51* (2013.01); *G06F 8/73* (2013.01); *G06F 11/3604* (2013.01); *G06F 21/563* (2013.01); *G06N 5/006* (2013.01); *G06F 8/33* (2013.01); *G06F 8/72* (2013.01); *G06F 2221/033* (2013.01)

(58) Field of Classification Search
CPC .... G06F 21/562; G06F 21/563; G06F 21/577; G06F 8/30; G06F 8/33; G06F 8/72; G06F 8/73; G06F 2221/033; G06F 11/36; G06F 11/3604; G06F 11/3612; G06N 5/006
USPC ........ 717/106, 110–113, 123, 124, 130, 131, 717/134, 135; 726/22, 25
See application file for complete search history.

(56) References Cited

U.S. PATENT DOCUMENTS 6,128,774 A * 10/2000 Necula ................ G06F 9/44589
717/126
7,284,274 B1 * 10/2007 Walls ....................... G06F 8/70
726/25

(Continued)

OTHER PUBLICATIONS

Bush, E., A Gold Standard for assessing the coverage of static analyzers, 2013 IEEE International Conference on Technologies for Homeland Security (HST), pp. 710-715, Nov. 2013, [retrieved on Jun. 28, 2018], Retrieved from the Internet: <URL:http://ieeexplore.ieee.org/>.*

(Continued)

*Primary Examiner* — Geoffrey St Leger
(74) *Attorney, Agent, or Firm* — Fish & Richardson P.C.

(57) ABSTRACT

Methods, systems, and apparatus, including computer programs encoded on a computer storage medium, for receiving source code and an indication that a portion of the source code is insecure. Receiving an annotation to the source code that identifies the indication as being a false positive indication. The annotation includes a logical statement showing that the portion of the source code is not insecure, where the logical statement can be executed by a processor to prove that the portion of the source code is not insecure. Processing the annotation to determine whether the logical statement proves that the portion of the source code is not insecure. In response to determining that the logical statement proves that the portion of the source code is not insecure, retaining the annotation in the source code, and removing the indication that the portion of the source code is insecure.

13 Claims, 7 Drawing Sheets

(51) Int. Cl.
*G06F 8/30* (2018.01)
*G06F 8/33* (2018.01)
*G06F 8/73* (2018.01)
*G06F 11/36* (2006.01)
*G06N 5/00* (2006.01)
*G06F 8/72* (2018.01)
*G06F 8/41* (2018.01)
*G06F 8/51* (2018.01)

(56) References Cited

U.S. PATENT DOCUMENTS

| | | | |
|---|---|---|---|
| 7,849,509 B2 | 12/2010 | Venkatapathy et al. | |
| 8,584,246 B2 | 11/2013 | Haviv et al. | |
| 8,726,254 B2* | 5/2014 | Rohde | G06F 9/44589 717/154 |
| 8,745,578 B2* | 6/2014 | Pistoia | G06F 11/3604 717/104 |
| 8,881,293 B1 | 11/2014 | Brucker et al. | |
| 8,935,794 B2* | 1/2015 | Brake | G06F 21/577 726/25 |
| 8,996,349 B2* | 3/2015 | Belenky | G06F 8/10 703/22 |
| 9,052,983 B2* | 6/2015 | Farchi | G06F 8/71 |
| 9,418,230 B2* | 8/2016 | Archer | G06F 21/577 |
| 2002/0046393 A1* | 4/2002 | Leino | G06F 9/44589 717/146 |
| 2002/0062476 A1* | 5/2002 | Saxe | G06F 8/433 717/126 |
| 2002/0112201 A1* | 8/2002 | Flanagan | G06F 9/44589 714/42 |
| 2007/0083853 A1* | 4/2007 | Cook | G06F 8/38 717/120 |
| 2007/0083933 A1* | 4/2007 | Venkatapathy | G06F 21/577 726/25 |
| 2009/0077532 A1* | 3/2009 | Denney | G06F 9/44589 717/106 |
| 2009/0100405 A1* | 4/2009 | Belenky | G06F 8/10 717/104 |
| 2010/0325620 A1* | 12/2010 | Rohde | G06F 9/44589 717/154 |
| 2011/0083124 A1* | 4/2011 | Moskal | G06F 8/43 717/126 |
| 2011/0087892 A1* | 4/2011 | Haviv | G06F 11/3692 713/187 |
| 2013/0145215 A1* | 6/2013 | Pistoia | G06F 8/43 714/38.1 |
| 2013/0152055 A1* | 6/2013 | Joshi | G06F 11/3604 717/131 |
| 2013/0185697 A1* | 7/2013 | Farchi | G06F 8/71 717/113 |
| 2013/0312102 A1* | 11/2013 | Brake | H04L 63/1433 726/25 |
| 2014/0208431 A1* | 7/2014 | Archer | G06F 21/577 726/25 |
| 2015/0013011 A1 | 1/2015 | Brucker et al. | |
| 2016/0179508 A1* | 6/2016 | Bates | G06F 8/71 717/121 |
| 2017/0075787 A1* | 3/2017 | Muske | G06F 11/3608 |

OTHER PUBLICATIONS

Yang, J., et al., MECA: an Extensible, Expressive System and Language for Statically Checking Security Properties, Proceedings of the 10th ACM conference on Computer and communications security, pp. 321-334, 2003, [retrieved on Aug. 18, 2017], Retrieved from the Internet: <URL:http://dl.acm.org/>.*

Flanagan, C., et al., Houdini, an Annotation Assistant for ESC/Java, Compaq Systems Research Center, 18 pages, 2000, [retrieved on Aug. 18, 2017], Retrieved from the Internet: <URL:http://citeseerx.ist.psu.edu/viewdoc/summary?doi=10.1.1.19.8640>.*

Huang et al., "Securing Web Application Code by Static Analysis and Runtime Protection," ACM 1-58113-844-X/04/0005, May 17-22, 2004, 12 pages.

Xie et al., "ASIDE: IDE Support for Web Application Security," ACSAC'11, ACM 978-4503-0672-0/11/12, Dec. 5-9, 2011, 19 pages.

* cited by examiner

MACHINE-CHECKABLE CODE-ANNOTATIONS FOR STATIC APPLICATION SECURITY TESTING

BACKGROUND

Static Application Security Testing (SAST) is an analysis technique for analyzing program code to detect potential problems within the source code. That is, SAST performs such analysis without actually executing (running) the source code. Potential problems with the code can include, for example, potentially insecure dataflows that can endanger either the security of safety of the program. However, static analysis tools (e.g., SAST tools) often over approximate the number of potential insecurities in a program, thus, resulting in many reported findings that are neither security nor safety relevant (e.g., false positives). In general, this leads to the need for complex and dynamic security policies as well as a significant increase in the costs for manual system audits.

SUMMARY

Implementations of the present disclosure include methods for analyzing the security of dataflows in programs by machine-checkable code-annotations. In some implementations, methods include actions of receiving source code and an indication that a portion of the source code is insecure. Receiving an annotation to the source code that identifies the indication as being a false positive indication. The annotation includes a logical statement showing that the portion of the source code is not insecure, where the logical statement can be executed by a processor to prove that the portion of the source code is not insecure. Processing the annotation to determine whether the logical statement proves that the portion of the source code is not insecure. In response to determining that the logical statement proves that the portion of the source code is not insecure, retaining the annotation in the source code, and removing the indication that the portion of the source code is insecure.

This and other implementations can each optionally include one or more of the following features. In some implementations, the source code can include a second indication that a second portion of the source code is insecure. In some implementations, the method can include the actions of receiving a second annotation to the source code that identifies the second indication as being another false positive indication, where the second annotation includes a second logical statement showing that the second portion of the source code is not insecure. Processing the second annotation to determine whether the second logical statement proves that the second portion of the source code is not insecure. In response to determining that the second logical statement cannot prove that the second portion of the source code is not insecure, removing the annotation in the source code, and retaining the indication that the portion of the source code is insecure.

In some implementations, the indication can be included in a list of potentially vulnerable portions of source code from a static application security testing process.

In some implementations, the method can include the actions of receiving a second indication that the portion of the source code is insecure as a result of performing a second static analysis of the source code, where the source code includes the annotation, and ignoring the second indication based on the second indication being associated with the portion of the source code that includes the annotation.

In some implementations, processing the annotation to determine whether the logical statement proves the portion of the source code is not insecure can include determining based on the portion of the source code and the logical statement that the logical statement serves as a formal proof that the portion of source code is not insecure.

In some implementations, the portion of the source code can provide a condition under which the logical statement must be true in order to prove that the portion of the source code is not insecure.

In some implementations, the method can include the actions of receiving a modification to the portion of the source code, and modifying the logical statement based on the modification to the portion of the source code to generate a modified logical statement.

In some implementations, the modification can be a change in syntax of the portion of the source code, and modifying the logical statement can include modifying a portion of the logical statement corresponding with change in the syntax of the portion of the source.

In some implementations, the modification can be a change in a boundary condition recited in the portion of the source code, and modifying the logical statement can include modifying a portion of the logical statement corresponding with the boundary condition.

In some implementations, the method can include the actions of processing the annotation to determine whether the modified logical statement proves that the portion of the source code and the modification is not insecure, and in response to determining that the modified logical statement proves that the portion of the source code and the modification is not insecure, retaining the annotation in the source code.

In some implementations, the method can include the actions of receiving a modification to the portion of the source code. Determining that the annotation cannot be modified based on the modification to the portion of the source code. Removing the annotation in response to determine that the annotation cannot be modified based on the modification to the portion of the source code.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the

DESCRIPTION OF DRAWINGS

Like reference symbols in the various drawings indicate like elements.

DETAILED DESCRIPTION

Figure 1:
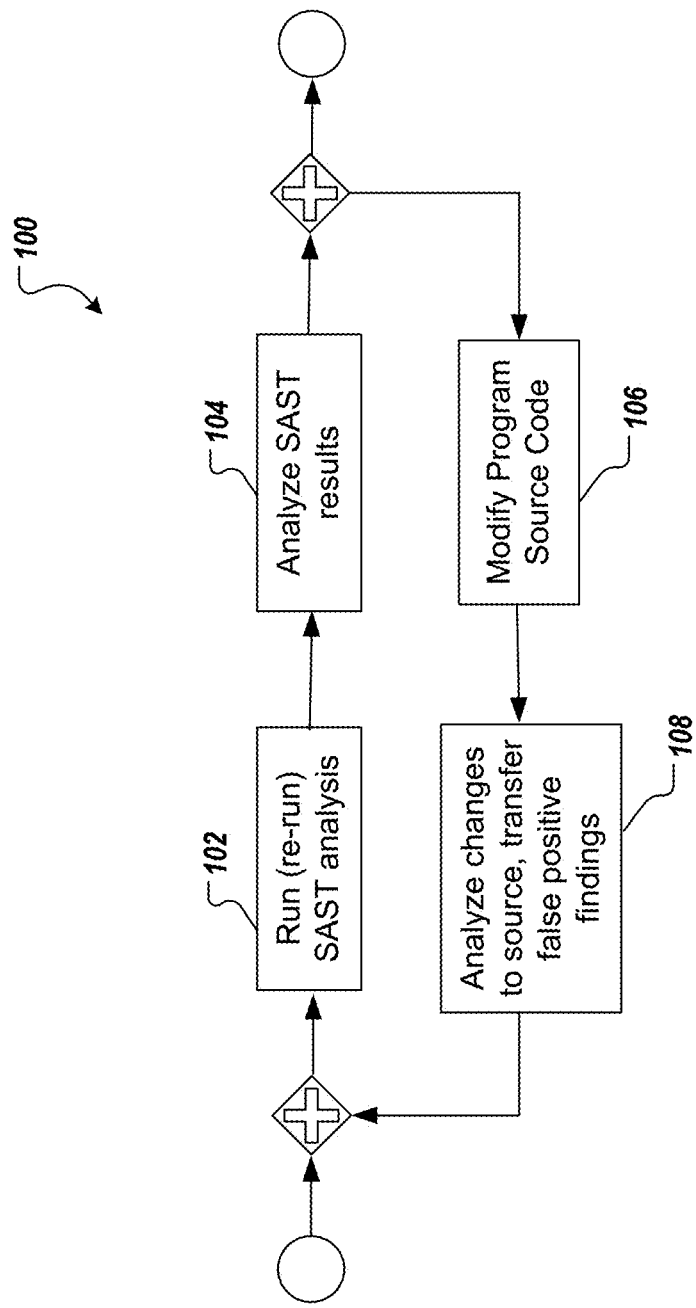
FIG. 1 depicts an example business process.

Implementations of the present disclosure are generally directed to analyzing the security of dataflows in programs by machine-checkable code-annotations. More particularly, implementations of the present disclosure are directed to using machine-checkable code-annotations for marking false positive results of static code analysis (SCA). In some implementations, the code-annotations serve as a machine verifiable proof that only SCA results that are in-fact false positives can be marked as false positive results. Code-annotations can be processed by a prover engine to determine whether the annotation is sufficiently strong to verify that the associated code is secure. If the code-annotation sufficiently proves the security of the associated code, the annotation can be retained in the code. As a result, when subsequent static code analyses are performed on the code, new SCA results that are associated with the same code as the proven annotation can be automatically ignored as false positive results.

As noted above, SAST techniques are used for analyzing program code to detect potential problems within the source code such as insecure code that may endanger the security of a computer program or computer system. Often, these problems are caused by unchecked (unvalidated) data-flows from a sink (e.g., input from a user) to a source (e.g., access to a database).

In some examples, static analysis tools, such as SAST tools, use over-approximation for efficiency and confidence in identifying all potential code vulnerabilities. However, such over-approximations produce false positive results (e.g., false positives). In other words, a SAST analysis may report results that indicate that a portion of code is insecure when, in fact, the portion of code is not a security or safety risk. True false positive results can be ignored.

To provide context for implementations of the present disclosure issues with current techniques are briefly discussed. In some examples, false positives are identified by an expensive manual processes performed after every SAST analyses of each component of a program, and a SAST tool may indicate hundreds or thousands of vulnerabilities in a program or component of a program. For example, an expert must decide, for each result, if the indicated vulnerability is a true vulnerability that must be fixed or a false positive that can be ignored. This analysis requires a high level of skill as well as a great deal of trust in the expert performing the analysis because marking a results as false-positive will immediately dismiss it from any correction list, and may result in serious vulnerabilities being shipped to customers if not performed properly. In some examples, there is no automatic reliability check of this manual analysis. In other words, any finding can be marked as a false positive. In addition, the manual assessment cannot be just copied to a SAST scan after the code has changed (e.g., after the code has been edited during a subsequent stage of development) because a former false positive may become a true vulnerability due to a coding change.

In contrast with the above, and as discussed in further detail herein, implementations of the present disclosure provide an efficient and reliable method for marking findings as false positives with machine-checkable annotations that safeguard the correctness of the judgment. In some implementations, machine-checkable annotations are reusable across multiple SAST scans, because changes to the associated code are replicated into the annotations.

FIG. 1 depicts an example process 100 for assessing SAST results as part of a comprehensive program development cycle. The process begins by running a SAST analysis on program source code (102). For example, a SAST analysis tool will process the source code and indicate potential vulnerabilities (e.g., insecure portions of code) in the code. In some examples, the source code is provided as a computer-readable file and can be provided in a programming language, e.g., C++, C#, Java, JavaScript, Python, Ruby, HTML, Bytecode. In some examples, a SAST tool may indicate hundreds or thousands of vulnerabilities in a program or component of a program.

The SAST analysis results are analyzed for false positive results (104). False positives are marked so that they can be ignored by developers when the developers modify the program to correct true vulnerabilities. The code is modified (106). For example, the code may be modified to correct vulnerability and to make other changes or improvements that are not related to the SAST analysis. The SAST analysis is re-run on the modified code (102). The modifications to the code are analyzed and the prior false positive analysis findings are transferred, if applicable, to the modified code (108). For example, if code associated with a prior false positive mark was either not modified or only slightly modified, the prior false positive marking is applied to the new SAST results. However, if the code associated with a prior false positive mark was significantly modified such that the prior false positive mark is no longer applicable (or it cannot be determined if the mark is applicable) the prior mark cannot be applied to the new SAST results. The SAST analysis results are re-analyzed for false positive results (104). For example, new SAST results are checked for false positives and those for which false positive markings were removed in step 108 are re-analyzed for false positives.

Implementations of the present disclosure will be discussed in further detail herein with reference to an example portion of source code (Example Code 1). The example portion of source code is provided as:

---

Example Code 1

```
1    void fun (HttpServletRequest req, HttpServletResponse resp
         , int i, int n)
2            throws IOException {
3        String x = "safe";
4        String x_in = req.getParameter (" fName ");
5        PrintWriter out = resp.getWriter ( );
6        while (i<n) {
7            if (i == n - 1) {
8                x = "safe";
```

-continued

Example Code 1

```
 9              ++i;
10              continue;
11          }
12          x = x_in;
13          ++i;
14      }
15      SQL.exec (x);
16  }
```

In the example source code, it is not obvious if an insecure dataflow (e.g., exists from req.getParameter (line 4) to SQL.exec (line 15). In fact, to show that this program is, indeed, secure, a SAST analysis must determine that after the termination of the while loop (line 6-14), the fact x=="safe" holds. Indeed, many SAST analyses will not make such a determination and, instead, report a potential insecure dataflow from req.getParameter (line 4) to SQL.exec (line 15) of the example source code. This an example of a false positive. In some examples, SAST tools will create a large number of false positives for even simpler examples.

Implementations of the present disclosure use machine-checkable code annotations to mark false positive SAST results. An example machine-checkable code annotation is included from line 6 to line 9 in the annotated source code example (Example Code 2) below.

Example Code 2

```
 1  void fun (HttpServletRequest req, HttpServletResponse resp,
         int i, int n)
 2              throws IOException {
 3      String x = "safe";
 4      String x_in = req.getParameter (" fName ");
 5      PrintWriter out = resp.getWriter ( );
 6      // @SecurityCodeScan{
 7      //     auditor = 'd000042',
 8      //     ensures = 'i == n - 1 implies x == "safe"'
 9      // }
10      while (i<n) {
11          if (i == n - 1) {
12              x = "safe";
13              ++i;
14              continue;
15          }
16          x = x_in;
17          ++i;
18      }
19      SQL.exec (x);
20  }
```

Here, the example code can be shown to be secure by the fact that after the execution of the while loop (line 6-14), for example, when "i==n-1, the statement x=="safe" will be true for all input values. Thus, the annotation includes this information in a logical statement that can be verified by an automatic prover. For example, as described in more detail below, the logical statement (e.g., the ensures clause) of the code annotation (line 8) can be executed by an automated prover along with the associated source code to determine whether the logical statement proves that the code is secure. In the example shown, the logical statement ensures='i==n-1 implies x=="safe"' is a strong enough witness to allow a fully automated prover to verify that this code is secure (e.g., to prove that the code is secure). Note that this code annotation is active, even-though it is part of a code comment, such that the annotation will not interfere with regular program code. For example, the code annotation may be ignored by a program compiler because it is included in a code comment format, but will be recognized and executed by a prover. For example, the annotation can include syntax (e.g., "@SecurityCodeScan") that is specific to an automatic prover, and which causes the prover to distinguish annotations from other code comments.

In some examples, annotations such as that shown Example Code 2, may improve the reliability of false positive assessments. For example, the annotation can be automatically verified (e.g., formally proven). That is, the logical statement in the annotation provides a witness that enables the prover to formally prove the security of the associated portion of the source code. Therefore, the likelihood of a SAST result being erroneously marked as a false positive may be reduced. Furthermore, the logical statement may ensure that, when code associated with an annotation is modified, the annotation is only retained if the logical statement remains valid (e.g., the logical statement can still be proven in the context of the modified code). On the other hand, if a modification to the associated code invalidates the formal proof, the annotation must be changed accordingly, if possible. In some implementations, if the annotation cannot be changed to prove that the portion of code is secure, the annotation can be removed. In such cases, the modification to the code may have created a vulnerability in the code, such that it is no longer secure.

Figure 2:
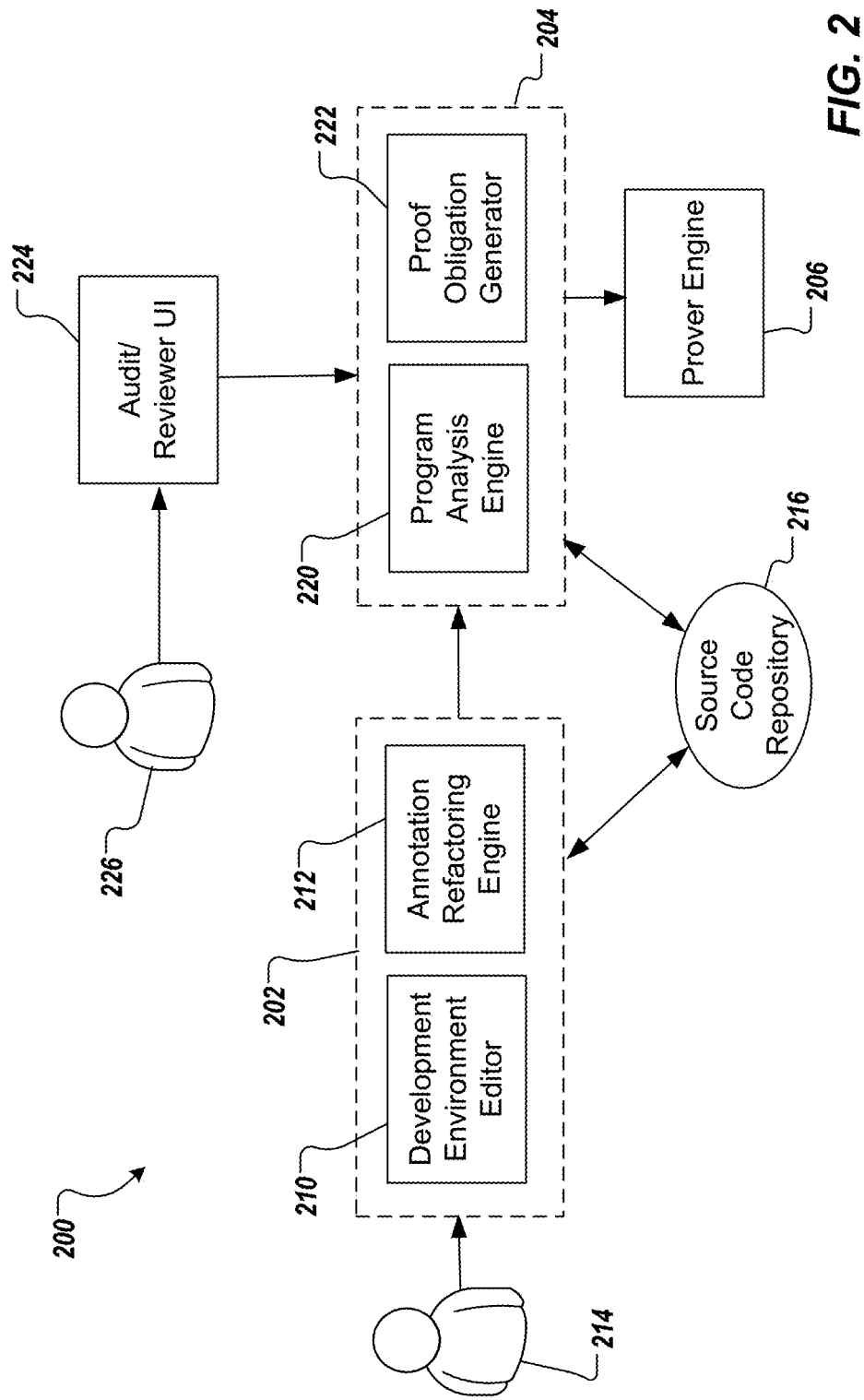
FIG. 2 depicts an example system architecture for executing implementations of the present disclosure.

FIG. 2 depicts an example system architecture 200 for executing implementations of the present disclosure. The system architecture 200 includes a development system 202, a static analysis system 204, and a prover engine 206. As discussed herein, the static analysis system 204 receives source code associated with a program from the development system 202. The static analysis system 204 analyzes the source code for vulnerabilities and provides indications of potentially vulnerable portions of code. The results of the static analysis can be analyzed and annotated with machine-checkable annotations to mark any false positive results. The prover engine 206 can process the source code and annotations to determine whether the annotation proves that an associated portion of source code is secure and does not possess a vulnerability.

In the depicted example, the development system 202 includes a development environment editor 210 and an annotation refactoring engine 212. In some examples, the development system 202 is provided as one or more computer-executable programs that can be executed using one or more computing devices. For example, the development system 202 provides a user interface for developers 214 to create, debug, and modify program code. In some implementations, developers 214 can initiate a static analysis of a program as well as insert annotations that serve as witness for the absence of a security vulnerability through the development system 202. In some examples, the development environment editor 210 provides the user interfaces of the development system 202 for developers 214 to create, debug, and modify program code. In some examples, the development environment editor 210 includes one or more computer-executable programs that can be executed using one or more computing devices. In some examples, the development environment editor 210 is an integrated development environment (IDE).

In some examples, the annotation refactoring engine 212 is a component of the development system 202 that analyzes changes made to program code (e.g., changes made be a developer 214) and propagates the changes to annotations. For example, the annotation refactoring engine 212 can propagate changes made to a particular portion of code to an annotation associated with the portion of code. For example, if a variable used in the portion of source code is renamed (e.g., "i" of the Example Code 2 is renamed to "p") the annotation refactoring engine 212 can automatically rename a corresponding variable used in the associated annotation (e.g., renaming "i" of the annotation in Example Code 2 to "p").

In some examples, program code can be stored in a source code repository 216 that is accessible to the development environment editor 210 and the annotation refactoring engine 212. The source code repository 216 can be an electronic storage (e.g., file system or a database) that stores the source code (including annotations to the source code). The source code repository 216 can permit components of the development system 202 and the static analysis system 204 to access (e.g., read and write data) program code stored in the source code repository 216. In some examples, the source code repository 216 can provide access to different versions (e.g., historical versions) of program code.

In the depicted example, the static analysis system 204 includes a program analysis engine 220 and a proof obligation generator 222. In some examples, the program analysis engine 220 is provided as one or more computer-executable programs that can be executed using one or more computing devices. In some examples, program analysis engine 220 performs one or more static analyses (e.g., SAST analyses) on program code. For example, static analyses can include control- and data-flow analyses, which computes the abstract control-flow and/or data-flow of the program code under test. The program code is analyzed for potential security vulnerabilities. In some examples, the results of the analysis indicate of portions of the program code that contain potential vulnerabilities.

In some examples, the proof obligation generator 222 is provided as one or more computer-executable programs that can be executed using one or more computing devices. In some examples, the proof obligation generator 222 determines proof obligations that show the absence of a vulnerability in a portion of code. In some examples, the proof obligation generator 222 can determine proof obligations for an annotation based on the portion of source code associated with the annotation (e.g., the data-flows and control-flows in the source code) and the logical statement of the annotation. For example, the proof obligations can serve as assumption based on the portion of source code under which the logical statement in the annotation must be to be true to show that the portion of source code is secure. In other words, the portion of source code may provide a condition under which the logical statement must be true (e.g., the proof obligation) in order to prove that the portion of code is not insecure. For example, a proof obligation for the Example Code 2 may be i==n−1 implies x=="safe", expressing that after the termination of the while loop (e.g., when i==n holds), x contains the value "safe" (e.g., x=="safe" holds).

In addition, the logical statement in the annotation must imply the absence of a vulnerability in the portion of source code in view of the proof obligations. For example, the logical statement: ensures='i==n−1 implies x=="safe"' may imply that the example code is secure because the user input ("x_in") that was assigned to "x" is replaced by "safe" before the while loop terminates and the use input is not written to a database.

In some examples, the static analysis system 304 includes an Audit/Reviewer interface 224. The Audit/Reviewer interface 224 is a dedicated user interface that allows security experts 226 to review results of the static analysis together with the underlying coding. In some examples, the Audit/Reviewer interface 224 also allows experts 226 to insert annotations into the code.

In some examples, the prover engine 206 is provided as one or more computer-executable programs that can be executed using one or more computing devices. The prover engine 206 engine evaluates logical statements included in annotations to determine whether the logical statements prove that the associated code is secure. In some examples, the prover engine 206 incorporates fully automated theorem provers (e.g., satisfiability modulo theories (SMT) solvers, Boolean Satisfiability Problem (SAT) solvers, or both) to evaluate logical statements included in code annotations.

Figure 3A:
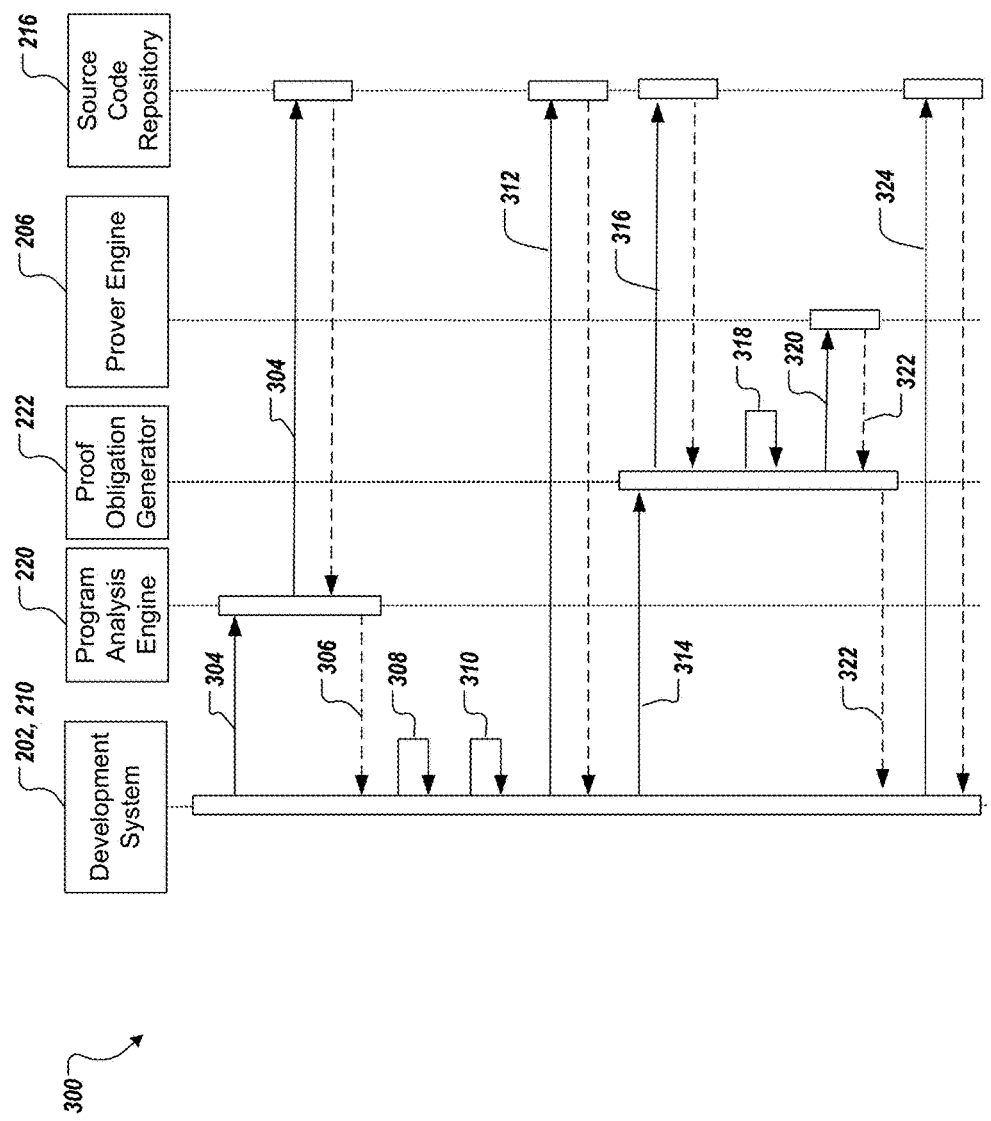
FIGS. 3A-3C depict example sequence diagrams in accordance with implementations of the present disclosure.
Figure 3B:
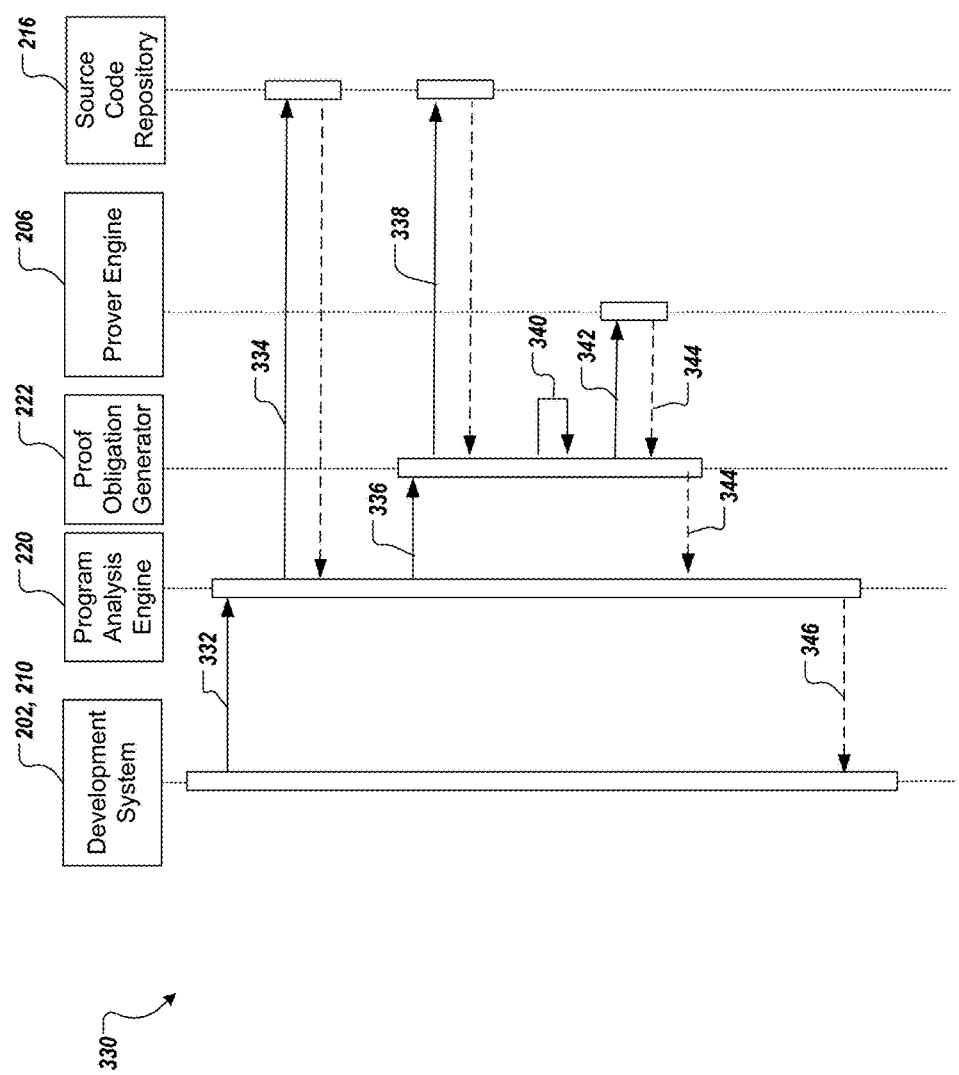
Figure 3C:
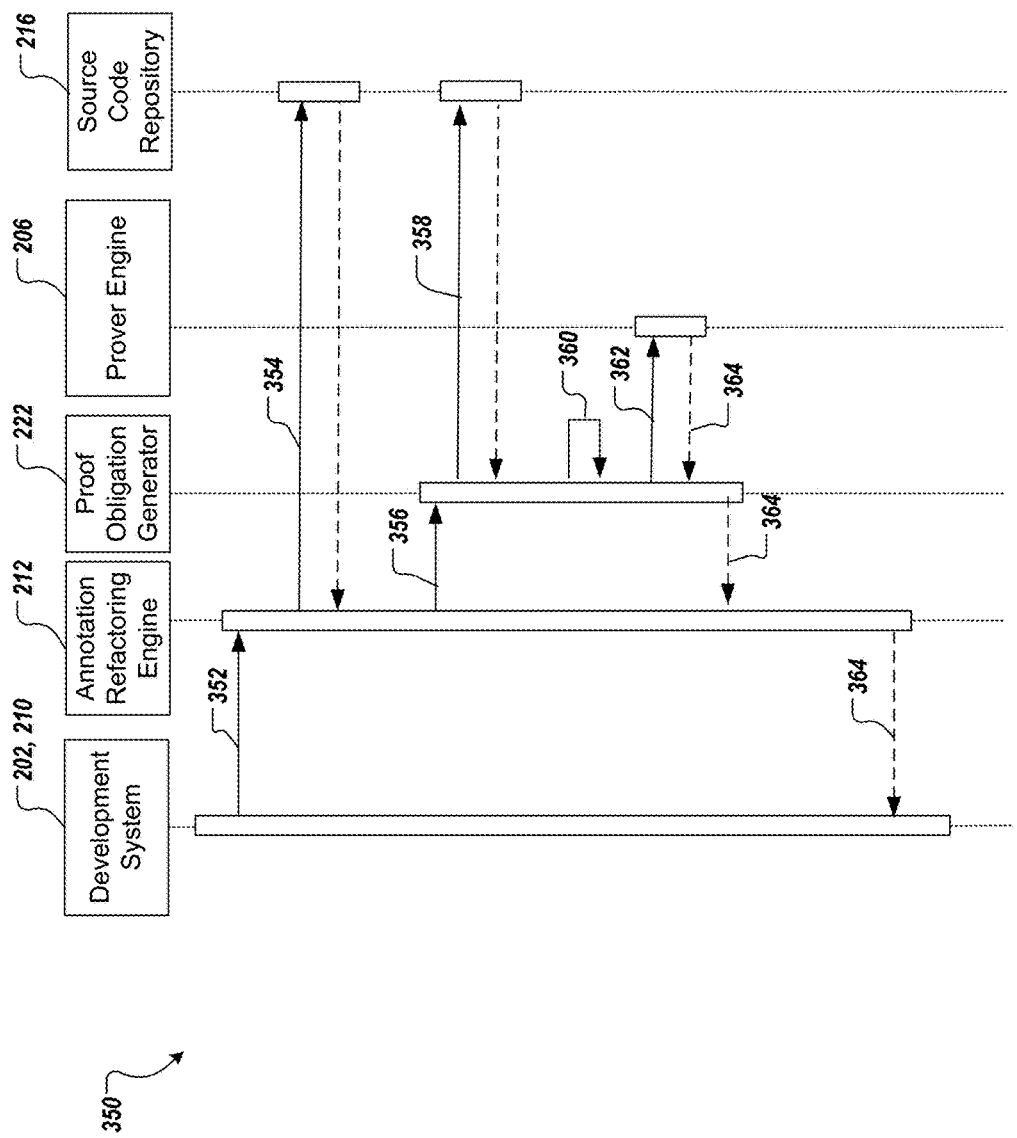

Referring now to FIGS. 3A-3C, the example use case will be described in further detail. FIGS. 3A-3C depict an example sequence diagrams in accordance with implementations of the present disclosure. The sequence diagrams depicts example communications between components of the system architecture 200 of FIG. 2 in accordance with implementations of the present disclosure.

The sequence diagram 300 of FIG. 3A is a diagram of a program code development and static analysis sequence. In the depicted example, a program developer (e.g., the developer 214 of FIG. 2) interacts with the development system 202 (e.g., through the development environment editor 210) to writes and edits source code for a computer program. In some examples, the developer can initiate SCAs of the source code and review the results of SCAs through the development environment editor 210.

In some examples, and in response to input, the development environment editor 210 issues a request 302 to the program analysis engine 220. In some examples, the request 302 is a request to perform an SCA on program source code. In some examples, the request 302 identifies the source code. In some examples, the request 302 identifies a type of SCA to be performed. In response to the request 302, the program analysis engine 220 accesses the source code from the source code repository 216. For example, the program analysis engine 220 can send an access request 304 to the source code repository 216 that identifies the source code. In response to the access request 304, the source code repository 216 can send the identified source code to the program analysis engine 220. In some examples, the program analysis engine 220 can access the source code directly from the development system 202.

In response to receiving the program source code, the program analysis engine 220 performs an SCA on the code. In some examples, the SCA includes evaluating data structures that represent the control-flow of the source code. In some examples, the SCA includes evaluating data-flow of the source code. In some examples, the SCA includes identifying vulnerable sinks and sources in the source code. The program analysis engine 220 generates results based on the SCA. The SCA results indicate which, if any, portions of the source code are insecure (e.g., include vulnerabilities). In some examples, the SCA results can be included in an electronic file separate from the source code (e.g., an SCA report).

The program analysis engine 220 sends a response 306 to the request 302 to the development environment editor 210. The response 306 includes the SCA results. In some examples, the program analysis engine 220 sends the SCA results to an Audit/Reviewer interface 224 in addition to or instead of sending the SCA results to the development environment editor 210. The SCA results can be reviewed 308 by a developer 214 (e.g., by interaction with the development environment editor 210) or an expert 226 (e.g., by interaction with the Audit/Reviewer interface 224). The developer 214 or expert 226 reviews 308 the SCA results to determine whether the SCA results include any false positive indications (e.g., an incorrect indication that a portion of code is insecure). For example, the developer 214 or expert 226 reviews 308 the SCA results to determine whether any of the portions of source code that are indicated as being insecure (e.g., having a vulnerability) are, in-fact, not insecure.

The development environment editor 210 or the Audit/Reviewer interface 224 receives annotations as inputs 310. For example, the developer 214 or expert 226 can add annotations to the source code to mark false positive results from the SCA. The annotations can be machine-checkable annotations as described above. For example, the annotations can include a logical statement that can be processed by prover engine 206 to verify the security of the portion of code associated with the annotation (e.g., prove the annotation). In some examples, the annotated source code is stored 312 in the source code repository 216.

In some examples, and in response to input, the development environment editor 210 issues a request 314 to the proof obligation generator 222. In some examples, the request 314 is a request to check the false positive annotations in the source code. In some examples, the request 314 identifies the annotated source code. In response to the request 314, the proof obligation generator 222 accesses the annotated source code from the source code repository 216. For example, proof obligation generator 222 can send an access request 316 to the source code repository 216 that identifies the annotated source code. In response to the access request 316, the source code repository 216 can send the identified source code to the proof obligation generator 222. In some examples, the proof obligation generator 222 can access the annotated source code directly from the development system 202.

In some examples, in response to receiving the program source code, proof obligation generator 222 determines proof obligations 318 for each annotation in the source code. For example, the proof obligation generator 222 can determine proof obligations for an annotation based on the portion of source code associated with the annotation (e.g., the data-flows and control-flows in the source code) and the logical statement of the annotation. As described above, the proof obligations can serve as assumption based on the portion of source code under which the logical statement in the annotation must be to be true to show that the portion of source code is secure. In addition, the logical statement in the annotation must imply the absence of a vulnerability in the portion of source code in view of the proof obligations.

The proof obligation generator 222 issues a request 320 to the prover engine 206. In some examples, the request 320 is a request to verify the annotations in the source code. In some examples, the request 314 includes the annotated source code. In some examples, the request 320 includes the proof obligations.

In response to the request 320, the prover engine 206 processes the source code and annotations (e.g., the logical statements). The prover engine 206 determines whether the logical statements prove that the associated portions of source code are secure (e.g., are not insecure for having a vulnerability). For example, the prover engine can use automated theorem provers to discharge the proof obligations. For example, the prover engine 206 can discharge a proof obligation by determining whether the theorem provers can show that both that the source code implies the logical statement in the annotation and that the logical statement implies that the source code is secure (e.g., that the source code does not have a vulnerability).

For example, referring to the Example Code 2, the while loop and if statement imply that the logical statement in the annotation is true; when i==n−1, x will be set to "safe". Furthermore, the logical statement ensures='i==n−1 implies x=="safe"' implies that the example code is secure because the user input ("x_in") that was assigned to "x" is replaced by "safe" and the user input (i.e., the input that potentially could be modified by an attacker) is not written to a database.

If the prover engine 206 determines that an annotation does prove that the associated portion of source code is secure (e.g., the proof obligations can be discharged) then the annotation will be retained in the code. If the proof obligations can be discharged then the prover engine 206 has verified that the annotation sufficiently proves that the associated portion of code is secure, and thus, any SCA indication that the portion of code contains a vulnerability is a false positive indication.

On the other hand, if the prover engine 206 determines that an annotation does not prove that the associated portion of source code is secure (e.g., the proof obligations cannot be discharged) then the annotation will be rejected. If the proof obligations cannot be discharged then the prover engine 206 has not verified that the annotation proves that the associated portion of code is secure, and thus, any SCA indication that the portion of code contains a vulnerability is not a false positive indication. In some examples, the annotation will be removed from the code. In some examples, the annotation will be marked as rejected, for example, so that a developer 214 or expert 226 can re-evaluate and correct the annotation, if necessary.

A response 322 to the requests 320 and 314 is sent to the proof obligation generator 222 and the development system 202. The response 322 can include the results of the annotation checks, and, in some examples, the source code is stored 324 at the source code repository 216 with the remaining (verified) annotations. In some examples, the proof obligation generator 222 and prover engine 206 use formal analysis techniques to reduce the number of findings of the static analysis, if and only if, the code annotations are strong enough to formally prove that the associated portion of source code is secure.

The sequence diagram 330 of FIG. 3B is a diagram of a static analysis sequence of program code including machine-checkable annotations. In the depicted example, a program source code has already undergone the process explained above with respect to sequence diagram 330. The program source code includes one or more annotations that, in some examples, have been verified by a prover engine 206 to show that associated portions of source code are secure, and, by extension, that any SCA indications that the portions of source code include a vulnerability are false positive results.

In some examples, and in response to input, the development environment editor 210 issues a request 332 to the program analysis engine 220. In some examples, the request 332 is a request to perform an SCA on the annotated program source code. In some examples, the request 332 identifies the annotated source code. In some examples, the request 332 identifies a type of SCA to be performed. In response to the request 332, the program analysis engine 220 accesses 334 the annotated source code from the source code repository 216, as described above.

In some examples, if the annotations have been verified, the program analysis engine 220 performs an SCA on the annotated source code, for example, as described above in reference to FIG. 3A. The program analysis engine 220 generates results based on the SCA. The SCA results indicate which, if any, portions of the source code are insecure (e.g., include vulnerabilities). In some examples, if the SCA generates a result indicating a vulnerability for a portion of code that includes an annotation, the result (indication) is ignored based on the proven annotation. The program analysis engine 220 sends a response 346 to the request 332 to the development environment editor 210. The response 346 includes the remaining SCA results. In some examples, ignored SCA results are deleted from or not included in the final SCA results that are sent to the development environment editor 210.

In some examples, if the annotations have not yet been verified, the program analysis engine 220 sends a request 336 to the proof obligation generator 222 to verify the annotations. As described above, in some examples, the proof obligation generator 222 accessed 338 the annotated source code. In some examples, the request 336 may include the annotated source code.

In some examples, the proof obligation generator 222 determines proof obligations 340 for each of the annotations, as described above (e.g., in step 318). The proof obligation generator 222 sends a request 342 to the prover engine 206 to verify the annotations (e.g., discharge the proof obligations of the annotations), as described above (e.g., in step 320). As above, the annotations that can be verified are retained in the source code and those that cannot be verified are removed from the source code.

A response 344 to the requests 342 and 336 is sent to the proof obligation generator 222 and the program analysis engine 220. The response 344 can include the results of the annotation checks (e.g., the source code including the verified annotations).

In response to receiving response 344, the program analysis engine 220 performs an SCA on the annotated source code, for example, as described above in reference to FIG. 3A. The program analysis engine 220 generates results based on the SCA. The SCA results indicate which, if any, portions of the source code are insecure (e.g., include vulnerabilities). In some examples, if the SCA generates a result indicating a vulnerability for a portion of code that includes an annotation, the result (indication) is ignored based on the proven annotation. The program analysis engine 220 sends a response 344 to the request 332 to the development environment editor 210. The response 344 includes the remaining SCA results. In some examples, ignored SCA results are deleted from or not included in the final SCA results that are sent to the development environment editor 210.

The sequence diagram 350 of FIG. 3C is a diagram of a sequence for propagating source code changes to machine-checkable annotations. In the depicted example, a program developer 214 interacts with the development system 202 (e.g., through the development environment editor 210) to edits source code that includes false positive annotations. In some examples, the development system 202 can automatically propagate changes that the developer 214 makes to the source code to applicable annotations. For example, in response to an input, the development environment editor 210 sends a request 352 to the annotation refactoring engine 212. In some examples, the request 352 is a request to propagate source code changes to associated annotations. In some examples, the request 352 identifies the source code.

In response to the request 352, the annotation refactoring engine 212 accesses the source code from the source code repository 216. For example, the annotation refactoring engine 212 can send an access request 354 to the source code repository 216 that identifies the source code. In response to the access request 354, the source code repository 216 can send the identified source code to the annotation refactoring engine 212. In some examples, the annotation refactoring engine 212 can access the source code directly from the development environment editor 210.

In response to receiving the program source code, the annotation refactoring engine 212 analyzes the source code to identify changes made to the source code that affect an annotation. For example, the annotation refactoring engine 212 propagates the changes made to a portion of source code surrounding an annotation (e.g., the annotation in Example Code 2) to the annotation. For example, if a variable used in the portion of source code is renamed (e.g., "i" of the Example Code 2 is renamed to "p") the annotation refactoring engine 212 can automatically rename a corresponding variable used in the associated annotation (e.g., renaming "i" of the annotation in Example Code 2 to "p"). As another example, if a boundary condition is changed in the portion of source code, the change of the boundary condition can also be propagated to the annotation. For example, if the if statement in the Example Code 2 is changed to if (i<=n-1), then the annotation refactoring engine 212 can automatically modify the logical statement in the annotation to state: ensures='i<=n-1 implies x=="safe"'.

In some examples, the annotation refactoring engine 212 may be unable to propagate a change made to the source code into an annotation. For example, the change may be too extensive to be propagated. In such examples, the annotation refactoring engine 212 can remove the annotation or mark the annotation with an indication that the annotation cannot be updated. Marking the annotation may, for example, allow a developer 214 or expert 226 to review the annotation changes and/or source code changes, and, if necessary, manually modify the annotation.

In some examples, the annotations are re-verified after source code modifications are propagated to the annotations. For example, a modification to the source code or the annotations may affect the ability of an annotation to sufficiently prove that the associated portion of source code is secure, or a modification to the source code may render the portion of source code insecure. For example, if the statement in the Example Code 2 is changed to if (i==n-2), the code is insecure as after the termination of the while loop, x==x_in holds. Thus, in some examples, the annotation refactoring engine 212 sends a request 356 to the proof obligation generator 222 to re-verify the annotations. As described above, the proof obligation generator 222 accesses 358 the annotated source code. In some examples, the request 356 may include the annotated source code.

In some examples, the proof obligation generator 222 determines proof obligations 360 for each of the annotations, as described above (e.g., in step 318). The proof obligation generator 222 sends a request 362 to the prover engine 206 to verify the annotations (e.g., discharge the proof obligations of the annotations), as described above (e.g., in step 320). As above, the annotations that can be verified are retained in the source code and those that cannot be verified are removed from the source code.

A response 364 to the requests 342 and 336 is sent to the proof obligation generator 222 and the development system 202. In some examples, the response 364 includes the results of the annotation checks (e.g., the source code including the verified annotations) and the source code with the modified annotations that have been successfully re-verified.

Figure 4:
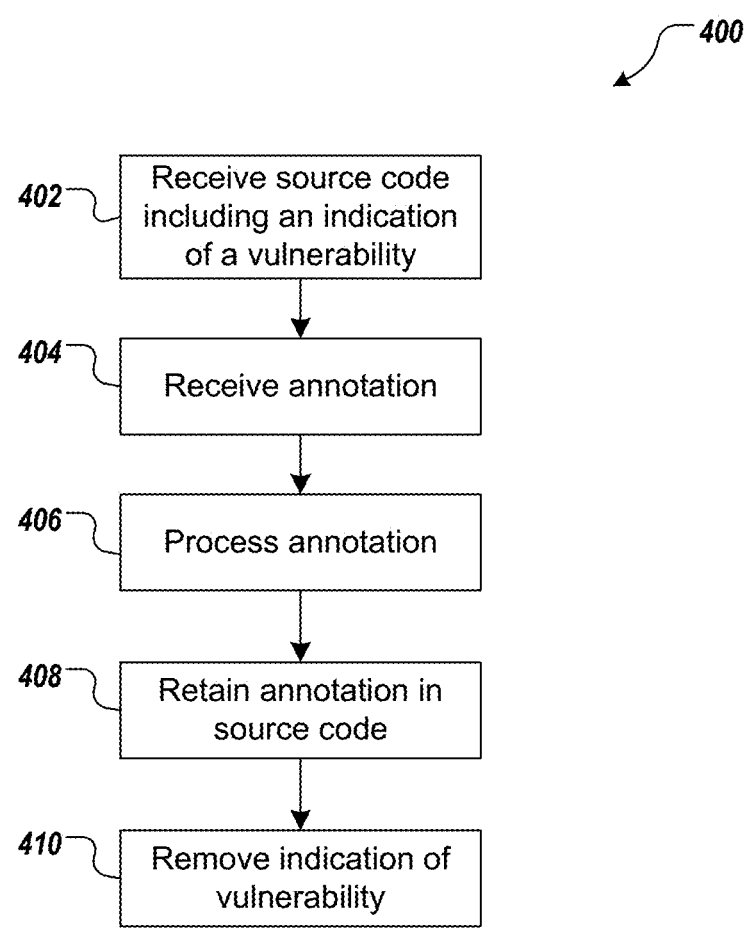
FIG. 4 is a flowchart illustrating an example process that can be executed in implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices.

Source code is received along with an indication that a portion of the source code is insecure (402). More particularly, the source code includes source code of a computer-implemented program that that has been tested by a SCA process. The indication is a result of the SCA process and indicates that the SCA process determined the portion of code to be insecure. For example, and with reference to FIG. 2, the static analysis system 204 can receive the source code from the source code repository 216 and process the code using SAST techniques to generate the indication. An annotation to the source code is received (404). More particularly, the annotation identifies the indication as being a false positive indication, and includes a logical statement showing that the portion of the source code is not insecure. The logical statement is executable by, for example, the prover engine 206 of FIG. 2. For example, and with reference to FIG. 2, the static analysis system 204 can receive annotation from the proof obligation generator 222. The annotation is processed (406). More particularly, the annotation is processed to determine whether the logical statement proves that the portion of the source code is not insecure. For example, and with reference to FIG. 2, the prover engine 206 processes the annotation. The annotation is retained in the source code (408), and the indication that the portion of the source code is insecure is removed (410) in response to determining that the logical statement proves that the portion of the source code is not insecure. For example, if the prover engine 206 determine that the logical statement proves that the portion of the source code is not insecure, the annotation can be retained in the source code to prevent subsequent runs of the SCA from marking the portion of code as in secure, and the indication that the portion of code is insecure can be removed.

Figure 5:
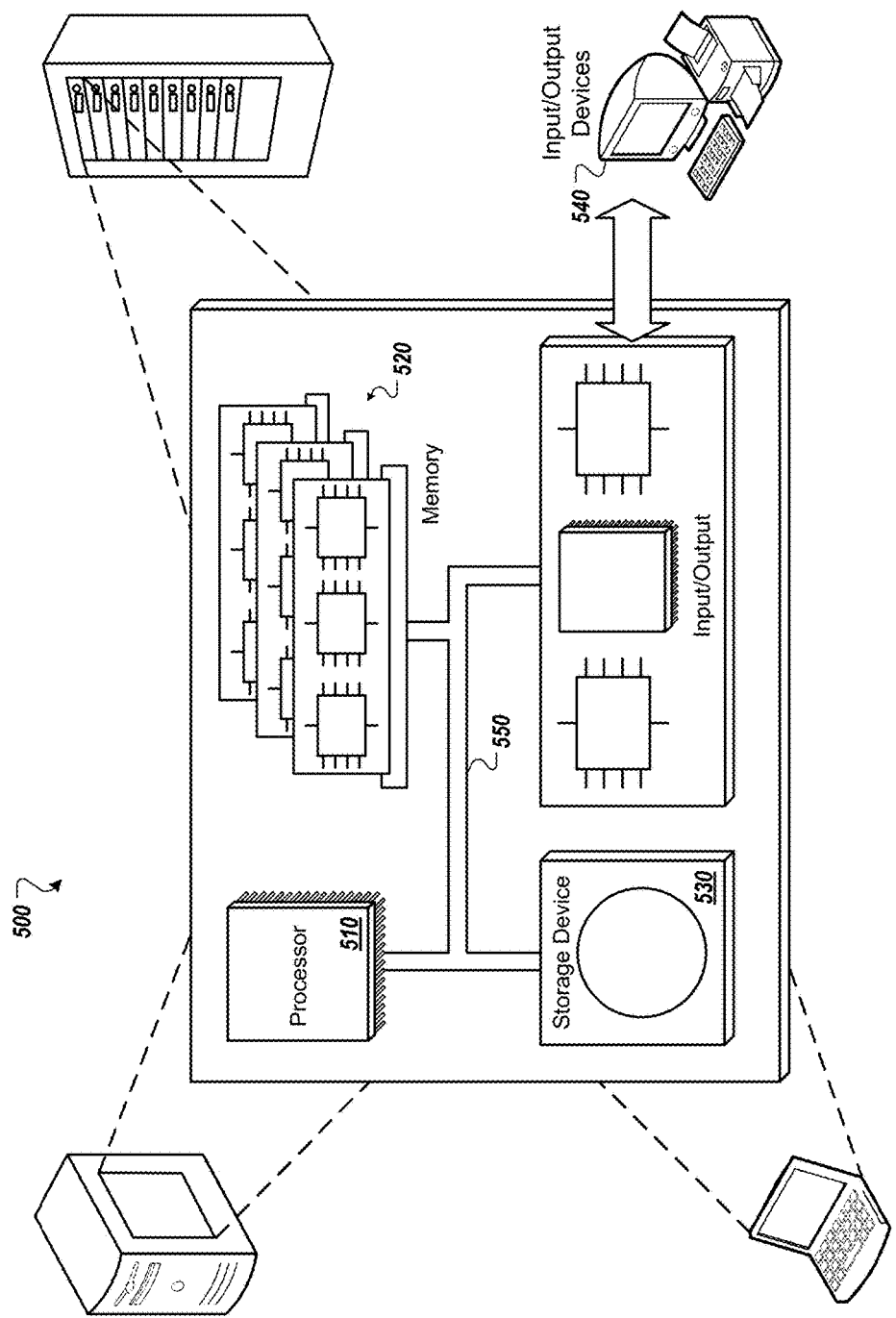
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for analyzing security of dataflows in programs, the method being executed by one or more processors and comprising:
   receiving, by the one or more processors, a source code and an indication that a portion of the source code is insecure;
   receiving, by the one or more processors, an annotation to the source code that identifies the indication as being a false positive indication, the annotation comprising a logical statement showing that the portion of the source code is not insecure by indicating that one or more proof obligations associated with the source code are dischargeable, wherein the logical statement ensures that, when the source code associated with the annotation is modified, the annotation is only retained if the logical statement remains valid by being provable for respective modification of the source code, the logical statement being executable by the one or more processors to prove that the portion of the source code is not insecure;
   processing, by the one or more processors, the annotation, by using automated theorem provers, to determine whether the source code implies the logical statement in the annotation, the logical statement proving that the portion of the source code is not insecure by indicating an absence of a vulnerability in the portion of the source code; and
   in response to determining that the logical statement proves that the portion of the source code is not insecure by discharging the one or more proof obligations:
      retaining the annotation in the source code,
      in response to retaining the annotation, preventing subsequent runs of a testing process from marking the portion of the source code as insecure, and
      removing the indication that the portion of the source code is insecure.

2. The method of claim 1, wherein the source code includes a second indication that a second portion of the source code is insecure, and the method further comprises:
   receiving a second annotation to the source code that identifies the second indication as being another false positive indication, the second annotation including a second logical statement showing that the second portion of the source code is not insecure;
   processing the second annotation to determine whether the second logical statement proves that the second portion of the source code is not insecure; and
   in response to determining that the second logical statement cannot prove that the second portion of the source code is not insecure:
      removing the annotation in the source code, and
      retaining the indication that the portion of the source code is insecure.

3. The method of claim 1, wherein the indication is included in a list of potentially vulnerable portions of source code from a static application security testing process.

4. The method of claim 1, comprising:
   receiving a second indication that the portion of the source code is insecure as a result of performing a second static analysis of the source code wherein the source code includes the annotation; and
   ignoring the second indication based on the second indication being associated with the portion of the source code that includes the annotation.

5. The method of claim 1, wherein processing the annotation to determine whether the logical statement proves the portion of the source code is not insecure comprises determining based on the portion of the source code and the logical statement that the logical statement serves as a formal proof that the portion of source code is not insecure.

6. The method of claim 5, wherein the portion of the source code provides a condition under which the logical statement must be true in order to prove that the portion of the source code is not insecure.

7. The method of claim 1, comprising:
   receiving a modification to the portion of the source code; and
   modifying the logical statement based on the modification to the portion of the source code to generate a modified logical statement.

8. The method of claim 7, wherein the modification is a change in syntax of the portion of the source code, and
   wherein modifying the logical statement comprises modifying a portion of the logical statement corresponding with the change in the syntax of the portion of the source code.

9. The method of claim 7, wherein the modification is a change in a boundary condition recited in the portion of the source code, and
   wherein modifying the logical statement comprises modifying a portion of the logical statement corresponding with the boundary condition.

10. The method of claim 7, comprising:
    processing the annotation to determine whether the modified logical statement proves that the portion of the source code and the modification is not insecure; and
    in response to determining that the modified logical statement proves that the portion of the source code and the modification is not insecure, retaining the annotation in the source code.

11. The method of claim 1, comprising:
    receiving a modification to the portion of the source code;
    determining that the annotation cannot be modified based on the modification to the portion of the source code; and
    removing the annotation in response to determining that the annotation cannot be modified based on the modification to the portion of the source code.

12. A system for analyzing security of dataflows in programs, the system comprising:
    one or more computers; and a computer-readable medium coupled to the one or more computers having instructions stored thereon which, when executed by the one or more computers, cause the one or more computers to perform operations, the operations comprising:
  receiving a source code and an indication that a portion of the source code is insecure;
receiving an annotation to the source code that identifies the indication as being a false positive indication, the annotation comprising a logical statement showing that the portion of the source code is not insecure by indicating that one or more proof obligations associated with the source code are dischargeable, wherein the logical statement ensures that, when the source code associated with the annotation is modified, the annotation is only retained if the logical statement remains valid by being provable for respective modification of the source code, the logical statement being executable by one or more processors to prove that the portion of the source code is not insecure;
processing the annotation, by using automated theorem provers, to determine whether the source code implies the logical statement in the annotation, the logical statement proving that the portion of the source code is not insecure by indicating an absence of a vulnerability in the portion of the source code; and
in response to determining that the logical statement proves that the portion of the source code is not insecure by discharging the one or more proof obligations:
  retaining the annotation in the source code,
  in response to retaining the annotation, preventing subsequent runs of a testing process from marking the portion of the source code as insecure, and
  removing the indication that the portion of the source code is insecure.

13. A non-transitory computer-readable storage medium coupled to one or more processors and having instructions stored thereon which, when executed by the one or more processors, cause the one or more processors to perform operations for analyzing security of dataflows in programs, the operations comprising:
  receiving a source code and an indication that a portion of the source code is insecure;
  receiving an annotation to the source code that identifies the indication as being a false positive indication, the annotation comprising a logical statement showing that the portion of the source code is not insecure by indicating that one or more proof obligations associated with the source code are dischargeable, wherein the logical statement ensures that, when the source code associated with the annotation is modified, the annotation is only retained if the logical statement remains valid by being provable for respective modification of the source code, the logical statement being executable by the one or more processors to prove that the portion of the source code is not insecure;
  processing the annotation, by using automated theorem provers, to determine whether the source code implies the logical statement in the annotation, the logical statement proving that the portion of the source code is not insecure by indicating an absence of a vulnerability in the portion of the source code; and
  in response to determining that the logical statement proves that the portion of the source code is not insecure by discharging the one or more proof obligations:
    retaining the annotation in the source code,
    in response to retaining the annotation, preventing subsequent runs of a testing process from marking the portion of the source code as insecure, and
    removing the indication that the portion of the source code is insecure.

\* \* \* \* \*